UNITED STATES PATENT OFFICE

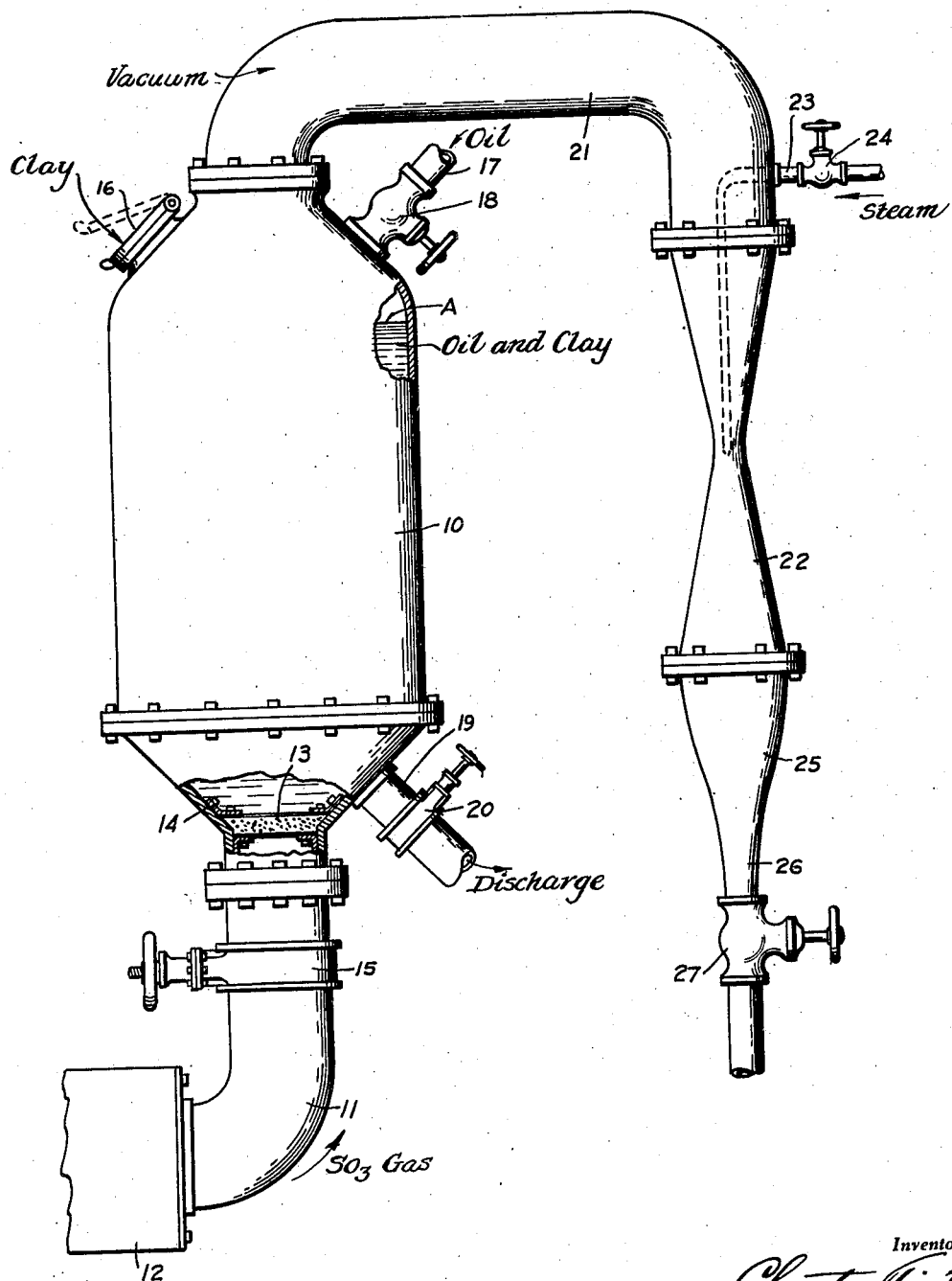

1,974,089

PROCESS OF DECOLORIZING MINERAL OIL

Chester Tietig, Los Angeles, Calif.

Application October 6, 1931, Serial No. 567,211

10 Claims. (Cl. 196—147)

The improved efficiency of acid activated clays, i. e., clays treated with sulfuric or hydrochloric acids at the boiling temperatures of dilute solutions of such acids, has long been recognized in the oil industry, where such clays are to some extent employed for decolorizing lubricating oils.

The use of such clays has not become very popular, however, on account of their high cost. It is an object of this invention to provide a process by which raw and finely ground activatable clay may have its decolorizing efficiency increased at the time it is used upon the oil to be decolorized, the activating agent being a stream of acid anhydride gas which simultaneously exerts an agitating effect upon the oil and clay mixture, thereby making the usual heavy agitating gear unnecessary. Such procedure greatly reduces the activating cost of the clays, and the acid anhydride gas is enabled to exert its own effect directly also upon the oil to produce the usual refining effect of acid treatment.

Referring now to the accompanying drawing, the figure shows, more or less diagrammatically, a contactor 10 having conical top and bottom. From below, the contactor is supplied though pipe 11 with hot $SO_3$ (sulfur trioxide) gas derived from a contact sulfuric acid plant (not shown), the stream of gas receiving compression by being passed through a gas compressor 12 which may be of any suitable acid proof type, and need not be capable of giving more than 80 pounds per square inch pressure to the gas. In the lower throat of the contactor, there is fitted a porous, acid proof plate 13 which is held in place by circular angle-iron 14. The plate may be larger than the internal diameter of pipe 11, but must not be smaller, since its function is to subdivide minutely, the stream of hot $SO_3$ passing upward into the oil in the contactor, from pipe 11. More surface contact, and hence more thorough treatment may be so obtained. Below the plate 13, which may be of "Carborundum", "Alundum" or "Filtros", there is a large gate valve 15, the function of which is to prevent oil from flowing back to compressor 12. Valve 15 may also be a ball check valve.

The contactor is also provided with the usual inlets and outlets for materials, these being a clay door 16, an oil inlet pipe 17 having the valve 18, an oil and clay outlet pipe 19 to the filters (not shown), this pipe having the valve 20.

From the apex of the top of the contactor, there extends a large diameter pipe 21, intended to carry off excess $SO_3$. This pipe may return to the gas compressor 12 so that the $SO_3$ may be used over and over again, or it may, as I have shown it, preferably terminate at a steam ejector 22, which is supplied with steam from a pipe 23 having a valve 24. The ejector is preferably vertical, and the lower end terminates in a cone 25 tapering to a pipe 26 in which there is a valve 27.

In operation, mineral lubricating oil, or other mineral oil to be decolorized, is first run into the contactor until its level stands about at A—A. A suitable charge of activatable clay, say montmorillonite or bentonite, either dry or mudded with water, is added. The clay must be able to pass a screen of 150 mesh per inch or finer. I prefer to use air dry clay of the montmorillonite type. The amount of clay used will be governed by its activity and the degree to which the oil is to be bleached. Valves 18 and 20 and door 16 are now closed, valves 24 and 27 opened and compressor 12 started. When a suitable degree of pressure has been generated, valve 15 is opened slowly and the hot $SO_3$ preferably at about 100° to 200° C. is allowed to penetrate plate 13 and ascend the contactor through the column of oil. The gas makes its exit through pipe 21, partially under the pull of the slight vacuum exerted by the ejector 22. The passage of a large number of streams of fine bubbles through the oil and clay results in very intimate contact of the clay with the $SO_3$ and oil, with consequent activation of the clay and the immediate utilization of the conferred bleaching power upon the oil.

Such gas as escapes the contactor becomes hydrated by the steam jet in the steam ejector, and therefore makes its exit as liquid $H_2SO_4$ from pipe 26. It will be seen therefore, that $H_2SO_4$ is a by-product of my process, and that this is obtained in reasonably pure condition.

Numerous modifications of my foregoing process may be practiced without departing from the spirit of the invention. The oil within the contactor may be treated to any temperature up to 650° F. before or while injecting $SO_3$, or steam and $SO_3$ may be injected simultaneously or alternately. The $SO_3$ may be circulated several times through the oil before being finally discharged. Gaseous HCl, $SO_2$ or Cl may be employed instead of $SO_3$, although these are not as desirable as the latter. Mixtures of either of the three gases with $SO_3$ may be employed. Previously acid activated clay may be used for the contacting, since this works better on oil in the presence of acidity.

After treatment, the oil may be left to stand long enough for an acid sludge to separate out before running the charge to the filters. This sludge may be separately disposed of. It consists mainly of petroleum sulfonic acids intermixed with clay.

When the foregoing process is practiced with $SO_3$ alone upon lubricating oil, there results a condition which is highly advantageous for the practice of a further step which results in greatly improved lubricants for the crank cases of internal combustion engines. This further step comprises neutralizing the petroleum sulfonic acids present in the oil with a lead or other heavy metal oxid, preferably PbO (litharge), and then removing all solid matter. Copper, zinc, antimony, or mercury oxids may be used. There then results a lubricating oil which has enhanced lubricating and cooling properties due to dissolved lead or other heavy metal. If the oil is burned away from the cylinder walls of the engine, it leaves a soft lead or lead oxid, or other metal or metal oxid deposit which fills pits in the metal surfaces and has anti-scoring properties.

While the lead oxid neutralizing step is not confined to the treatment of oils which have been blown with $SO_3$, it is peculiarly suited to them. It may also be practiced upon oils which have been acid treated with liquid $H_2SO_4$. In such case, a part of the sludge may be separated before neutralizing, and the residual oil with no separate sludge layer, or only a small one, may be neutralized with PbO. In the case of $SO_3$ blown oil, however, the residual acidity of the oil after blowing is considerably less in amount, although perhaps not in degree, than oils which have been $H_2SO_4$ treated. This is because of the comparative absence of water in the $SO_3$ treated oil, which oil has consequently less tendency to retain $SO_3$ or $H_2SO_4$.

Since the amount of lead petroleum sulfonic acid salt desired in finished lubricating oil is almost invariably under 15% by weight, it follows as a general rule that the less total acidity left in the oil after contacting the better the condition of the oil for making these special lead containing lubricants. The dry condition of the oil also discourages the formation of lead sulfate instead of lead sulfonate. Lead sulfate constitutes a waste of lead, since it is insoluble in oil, but lead sulfonate is soluble.

After neutralization, the oil may be reheated to any temperature below 700° F. in order to remove any loosely bound $SO_3$ capable of being eliminated by heating to such degree. This step is, of course, to eliminate any potential corrosive properties of the oil. Upon some oils it may not be necessary, in fact, if the blowing with $SO_3$ has been performed at a high temperature, it usually is not. The reheating may be to a higher temperature than that at which the contacting and blowing was done.

I claim as my invention:

1. The process of decolorizing mineral oils which comprises adding finely divided decolorizing clay to a body of such oil and then injecting a gaseous acid anhydride of a strong acid into said oil to stir and to mix said clay and oil for a time sufficiently long to decolorize the oil substantially.

2. A process according to claim 1, in which the anhydride is sulfur trioxide.

3. The process of decolorizing mineral oils which comprises adding finely divided activatable decolorizing clay to a body of such oil and then blowing sulfur trioxide through the body of the oil to stir and to mix said clay and oil for a time sufficiently long to decolorize the oil substantially.

4. The process according to claim 1 in which the anhydride is sulfur trioxide with the additional step of neutralizing the oil after sulfur trioxide treatment with a heavy metal oxid, then separating insoluble matter from the oil.

5. The process of decolorizing mineral oils which comprises adding to a body of such oil a quantity of finely divided activatable decolorizing clay, heating said oil and said clay to a decolorizing temperature and then blowing therethrough enough sulfur trioxide to stir and to materially activate said clay to substantially decolorize said oil and partially to sulfonate it.

6. A process according to claim 5 having the additional step of neutralizing the acidity of the oil after blowing, with litharge and thereafter separating the insoluble matter from the oil.

7. A process according to claim 5 having the additional step of creating a partial vacuum over the oil by means of a steam jet during the treatment, and with said steam, hydrating the sulfur trioxide leaving said oil.

8. A process according to claim 5 having the additional step of reheating the oil after contacting and blowing with sulfur trioxide, to a temperature higher than the contacting temperature, but below 700° F.

9. The process which comprises partially sulfonating mineral oil in the presence of decolorizing clay, then neutralizing the sulfonic acid with a heavy metal oxid, then separating the solid matter from the oil.

10. A process according to claim 9 in which the heavy metal oxid is litharge.

CHESTER TIETIG.